United States Patent [19]
Jen et al.

[11] Patent Number: 4,789,748
[45] Date of Patent: Dec. 6, 1988

[54] PROCESS FOR PREPARING ELECTRICALLY CONDUCTIVE POLY(ISOTHIANAPHTHENE) FROM 1,3-DIHYDROISOTHIANAPHTHENE

[75] Inventors: Kwan-Yue A. Jen, Flanders; Ronald L. Elsenbaumer, Morristown, both of N.J.

[73] Assignee: Allied-Signal, Inc., Morris Township, Morris County, N.J.

[21] Appl. No.: 788,372

[22] Filed: Oct. 17, 1985

[51] Int. Cl.$^4$ .......................................... C07D 409/00
[52] U.S. Cl. .......................................... 549/58; 549/3
[58] Field of Search .................... 549/3, 58; 252/500, 252/518, 519, 520, 521

[56] References Cited

U.S. PATENT DOCUMENTS 4,375,427  3/1983  Miller et al. .................... 252/512
4,462,929  7/1984  Shacklette et al. .................... 252/518

OTHER PUBLICATIONS

Wudl et al., J. Org. Chem., (1984), 49, pp. 3382-3384.
March, Textbook, "Advanced Organic Chemistry", McGraw-Hill Book Co., N.Y., 1977, pp. 651, 1077.
Cava et al., Jacs, (1959), vol. 81, pp. 4266-4268.
Morrison et al., Textbook, "Organic Chemistry", Allyn and Bacon, Inc., Boston, Ma., 1978, pp. 48, 49.

Primary Examiner—Mary C. Lee
Attorney, Agent, or Firm—Richard C. Stewart; Gerhard H. Fuchs

[57] ABSTRACT

A process for preparing electrically conductive poly(isothianaphthene) from 1,3-dihydroisothianaphthene by exposing an intimate mixture of 1,3-dihydroisothianaphthene and a oxidant/dopant such as ferric chloride to oxygen.

9 Claims, No Drawings

PROCESS FOR PREPARING ELECTRICALLY CONDUCTIVE POLY(ISOTHIANAPHTHENE) FROM 1,3-DIHYDROISOTHIANAPHTHENE

BACKGROUND OF THE INVENTION

1. Field of the Invention

This invention relates to a process for preparing electrically conductive poly(isothianaphthene) from 1,3-dihydroisothianaphthene. More particularly, this invention relates to such a process in which poly(isothianaphthene) is prepared by chemical means.

2. Prior Art

The field of polymeric conductors is rapidly expanding as more and more uses for these materials are being developed. Poly(heterocycles) have received attention because they can be prepared in film form, and because as a class, they are often more stable to atmospheric exposure than poly(acetylene) and doped poly(phenylene).

Electrically conductive poly(isothianaphthene) is potentially a useful polymeric conductor. One of the disadvantages attendant to the use of this material is the difficulty associated with its preparation. The conventional route for preparing electrically conductive poly(isothianaphthene) is described in F. Wudl, M. Kobayaski and A. J. Heeger, "Poly(isothianaphthene)", J. Org. Chem., 49, pp. 3382-3384 (1984). In this procedure, 1,3-dihydroisothianaphthene is converted into dihydroisothianaphthene S-oxide by the oxidation with sodium periodate in aqueous methanol. Dihydroisothianaphthene s-oxide is then dehydrated by treatment with a dehydration agent, such as $Al_2O_3$, at elevated temperature to form isothianaphthene which is, in turn, polymerized electrochemically in anhydrous solvents to form the electrically conductive poly(isothianaphthene) which is doped with the anion of the cell electrolyte.

SUMMARY OF THE INVENTION

We have surprisingly discovered a novel and convenient procedure for preparing poly(isothianaphthene) directly from 1,3-dihydroisothianaphthene eliminating at least two synthetic steps from the conventional route, and obviating the need for use of an electrochemical cell in the synthetic procedure. More particularly, the process of this invention comprises exposing 1,3-dihydroisothianaphthene to oxygen or a oxidant/dopant to directly form conductive poly(isothianaphthene) of film forming molecular weight. This process is of practical importance since it allows one to prepare doped electrically conducting poly(isothianaphthene) by a direct chemical method. Furthermore, this process provides a potential means of coating non-conductive substrates with an environmentally stable conductive poly(isothianaphthene) by spraying a solution of monomer on the substrate which in turn can be polymerized on exposure to air or by subsequent treatment with an oxidant/dopant. Such a process is useful for providing coated substrates for electrostatic dissipation, EMI shielding applications, as well as providing the polymer in a form suitable for formulating conductive inks for printing low current circuitry.

DETAILED DESCRIPTION OF THE INVENTION

In the process of this invention, a composition comprising 1,3-dihydroisothianaphthene is exposed to an acceptable oxidant/dopant system such as oxygen, $FeCl_3$, $NO^+$ salts, and the like to form conductive poly(isothianaphthene). Preferred for use in the practice of the invention are oxidant/dopants which form conductive poly(isothianaphthene). Useful oxidant/dopants are well known in the conductive polymer art, and any such known oxidant/dopant can be used. Illustrative of known oxidant/dopants which can be used in the practice of this invention are $MoOCl_4$, $MoCl_5$, $SbF_5$, $HClO_4$, $PCl_5$, $POCl_3$, $AsF_5$, $NO^+$ salts such as $NOBF_4$, $NOSbF_6$, and $NOCF_3SO_3$, Fe(III) salts such as $Fe(ClO_4)_3$, $Fe(CF_3SO_3)_3$, $FeCl_3$ and $FeBr_3$, $NO_2^+$ salts, a mixture $AlCl_3$ and $CuCl_2$, $(NH_4)_2S_2O_8$, and the like. Preferred for use in the practice of this invention are oxidising dopants selected from the group consisting of oxygen, $MoOCl_4$, $MoCl_5$, $PCl_5$, $POCl_3$, $Fe(ClO_4)_3$, $FeCl_3$, $NOBF_4$, $NOSbF_6$, and $NOCF_3SO_3$, and particularly preferred for use in the practice of this invention are oxidant/dopants selected from the group consisting of oxygen $MoOCl_4$, $NOBF_4$, $NOPF_6$, $NOSbF_6$, $NOCF_3SO_3$ and $FeCl_3$. Amongst these particularly preferred embodiments, most preferred are those embodiments in which the oxidizing dopant is $FeCl_3$ or $NOSbF_6$. In the preferred embodiments of the invention, an oxidant/dopant either alone or in combination with gas comprising oxygen is used. It can be appreciated that in those embodiments in which combinations of various oxidant/dopants, and a gas comprising oxygen is used, the amount of each is determined by the process employed to prepare or fabricate the conductive polymer article. Such combinations are particularly preferred for use in the practice of this invention.

The manner of carrying out the process of this invention is not critical. The form in which oxidant/dopant system is used is also not critical, and can vary widely. For example, in those embodiments of the invention in which oxygen is the oxidant/dopant, the composition containing 1,3-dihydroisothianaphthene can be exposed to pure oxygen, or to various gaseous mixtures containing oxygen, as for example air. In the preferred embodiments of the invention for convenience, the composition is exposed to air, other suitable oxidant/dopants or a combination thereof. Exposure methods are also not critical and can vary widely. For example, the composition in solid form can be exposed to oxygen or an oxygen-containing gas composition, as for example air. Alternatively, the composition can be dissolved in a suitable organic solvent and exposed to oxygen or other oxidant/dopants, or combination thereof or compositions comprising oxygen and/or with or without agitation, or oxygen or the gas stream comprising oxygen can be sparged through the system using conventional means.

In the preferred embodiments of the invention, the composition of 1,3-dihydroisothianaphthene and the suitable oxidant/dopant are mixed either with or without oxygen in an organic solvent. In these preferred embodiments, useful solvents may vary widely, the only requirement being that they are capable of solubilizing the 1,3-dihydroisothianaphthene, the oxidant/dopant, and oxygen, if used. Illustrative of such useful solvents are cyclic and linear ethers such as tetrahydrofuran, tetrahydropyran, dioxane, ethyl ether, dimethoxyethane, 2-methyltetrahydrofuran, and the like; sultones such as propane sultone, butane sultone, and the like; alkylalkane sulfonates such as methyl methane sulfonate, butyl methane sulfonate, propyl ethane sulfonate and the like; nitriles such as acetonitrile, propionitrile, butyronitrile and the like; halocarbons such as carbon tetrachloride, methylene chloride, and the like; aromatics such as benzene, toluene, xylene and the like; nitro compounds such as nitromethane, nitropropane nitrobenzene, and the like; ketones such as 4-methyl-2-pentanone and the like; esters such as methyl formate, ethylacetate and the like; carbonates such as propylene carbonate, ethylene carbonate and the like; amides and thioamides such as dimethyl formamide, dimethyl thioformamide, N-methyl pyrrolidinone and the like; and phosphorus and sulfur compounds such as dimethyl sulfoxide, diethylsulfoxide, sulfolane, sulfates, sulfites, phosphates, phosphites and the like. Preferred solvents are tetrahydrofuran, dimethoxyethane, acetonitrile, propionitrile, butyronitrile, methylene chloride, toluene, xylene, nitromethane, nitropropane, nitrobenzene, propylene carbonate, ethylene carbonate, dimethyl formamide, dimethyl sulfoxide, diethyl sulfoxide, sulfolane and N-methyl pyrrolidinone. Particularly preferred solvents are tetrahydrofuran, dimethoxyethane, acetonitrile, propionitrile, butyronitrile, methylene chloride, toluene, xylene, nitromethane, nitropropane, nitrobenzene, propylene carbonate, ethylene carbonate dimethyl formamide, dimethyl sulfoxide, diethylsulfoxide, sulfolane, and N-methyl pyrrolidinone, and most preferred solvents are nitromethane, nitropropane, nitrobenzene, dimethylformamide, N-methyl pyrrolidinone, propylene carbonate, toluene, xylene and methylene chloride.

The proportion of 1,3-dihydroisothianaphthene, oxidant/dopant, oxygen if used, and solvent are not critical and can vary widely. In general, the relative quantities are generally interdependent. For example, preferably, an amount of oxidant/dopant is employed which is sufficient to oxidise the 1,3-dihydroisothianaphthene to form poly(isothianaphthane), and to dope the resulting poly(isothianaphthene) to the extent necessary to provide the desired conductivity. Of course, such an amount of oxidant/dopant is dependent on the amount of polymer precursor present in the solution and can vary widely depending on the degree of doping desired. However, such an amount is preferably at least about 3 mole percent of dopant per repeat unit.

In the practice of this invention, 1,3-dihydroisothianaphthene can be polymerized in the solid state by exposure of 1,3-dihydroisothianaphthene crystals to gaseous oxygen (air) at room temperature to give conductive polyisothianaphthene. The solids can be ground up into a fine powder useful for forming dispersion in conventional polymers for antistat applications or for forming suspensions in appropriate vehicles for conductive ink formulations.

Alternatively, 1,3-dihydroisothianaphthene can be dissolved in the above-mentioned solvents at very low concentrations up to the saturation point of the compound in that solvent at temperatures from about −20° C. to the boiling point of the solvent. The solution can then be exposed to oxygen gas in a manner which is not critical. It can be appreciated that the rate of conversion to conductive polymer will depend on the extent and rate at which oxygen is brought into contact with the solution. Further, a suitable oxidant/dopant for the conversion, such as $FeCl_3$ may be added to this solution to speed up production of conductive polyisothianaphthene which separates from solution on formation. Alternatively, to the solution of 1,3-dihydroisothianaphthene can be added $NO^+$ salts or Fe(III) salts in sufficient quantity as for example (molar ratio of 1.0-1.1 relative to isothianaphthene) to convert 1,3-dihydoisothianaphthene directly to conductive poly(isothianaphthene) in the absence of oxygen. The polymer may be formed as a suspension. The solids can be filtered from the suspension and compacted to form solid conductive articles. In addition to polymer, the dopant and the solvent, other components may also be present which dissolve in the solution. These materials may be present to alter the physical or mechanical properties of either the solution or the article eventually cast from the solution. For example a soluble third component such as conventional polymers such as (polymethyl methacrylate), cellulose butyracetate, polystyrene, nylon 6, nylon 6,6, polyethylene terephthalate, copolymers of acrylonitrile, butadiene and styrene, polyvinyl chloride, polyethylene, polypropylene, and the like, in sufficient quantities such that on evaporation, a solid article is cast which is loaded with conductive poly(isothianaphthene) at levels sufficient to produce articles with the desired range of conductivities. This procedure would be especially useful for making antistatic materials for packaging sensitive electronic equipment, and the like. Likewise, it can be appreciated that the surface of a molded or shaped conventional polymer such as polyvinyl alcohol, polyvinyl chloride, acrylonitrile, butediene styrene copolymer, polypropylene, polyethylene, polyacrylonitrile and the like can be impregnated with a suitable catalyst (oxidant such as $FeCl_3$) then the inpregnated article exposed to vapors or liquid dihydroisothianaphthene so as to directly form conductive poly(isothianaphthene) on the surface of the substrate to modify its surface electrical properties. This procedure is especially useful for forming antistat finishes.

Process temperatures are not critical and can vary widely. For exmaple, the polymerization process can be carried out at temperatures as low as about −10° C. and as high as about 150° C. depending on a number of factors such as the particular solvent and oxidant dopant employed. In the preferred embodiments of the invention, the process is carried out at a temperature between about 0° C. and about 75° C., most preferably from about 15° C. to about 50° C. Similarly, process pressures are not critical and can vary widely. Because of the beneficial effect on the solubility of oxygen in the solvent, it is believed that higher pressures will have a beneficial effect on reaction rate. However, satisfactory results are obtained when autogenous pressures are employed, usually atmospheric pressure.

The reaction is carried out for a period of time necessary to obtain the desired amount of polymer having the desired molecular weight. In general, shorter reaction times are required when the composition of the oxidant/dopant and 1,3-dihydroisothianaphthene are contacted with oxygen in solution as compared to those embodiments in which these materials are contacted with as an intimate solid mixture. It can be appreciated that reaction terms can vary depending on reaction conditions such as reaction temperature and the nature of oxidant/dopant used. In general, reaction times of from about 1 hour to about 1 week will be employed. In the preferred embodiments of the invention, reaction times may vary from about 1 hour to 48 hours, and in the particularly preferred embodiments may vary from about 10 hours to about 24 hours.

Oxidant/dopants, 1,3-dihydroisothianaphthene and solvents useful in the practice of this invention are known materials which can be obtained from commercial sources, or prepared in accordance with known synthetic techniques. For exmaple, 1,3-dihydroisothianaphthene can be conveniently prepared by reacting sodium sulfide with 1,2-di-(bromomethyl) benzene. This procedure is described in detail in JACS, 81, p. 4266 (1959) which is hereby incorporated by reference.

Various methods are contemplated for using the preferred embodiment of the present invention. First, it is contemplated to remove the solvent from the solution preferably by evaporation. Alternatively the solvent can be removed by extraction with an extractant in which the solvent and dopant precursor are substantially more soluble than the doped polymer. It is contemplated that, if additional soluble components are introduced into the solution they will, unless also volatile, be present in the shaped article formed. If the additional component is a non-volatile liquid, then the removal of volatile components may leave a new liquid form of suspended doped conducting polymer.

Poly(isothianaphthene) is stable to atmospheric exposure which gives it an advantage over other conductive polymers such as poly(acetylene) or poly(phenylene), where air exposure is a condition under which the polymer is used. The doped poly(isothianaphthene) prepared in accordance with the process of this invention can be used in the same manner as other conductive polymers. Such uses include use as conductive films, battery electrodes and the like. Other uses of poly(isothianaphthene) prepared in accordance with this invention include antistatic materials, electromagnetic shielding materials, conductive inks for printing circuitry and the like. The manners in which such polymers can be used are well known in the art and will not be described herein in great detail.

Examples of articles formed from the polymer include conductive housings for sensitive electronic equipment (microprocessors), infrared and microwave absorbing shields, flexible electrical conducting connectors, conductive bearings and brushes, semiconducting photoconductor junctions, and the like.

The following specific examples are present to illustrate the invention and are not to be construed as limitations thereon.

EXAMPLE I

To a solution of dry sodium sulfide (7.8 g, 0.1 mole) in 100 ml of anhydrous ethanol at room temperature under nitrogen was slowly added 1,2-di-(bromomethyl)benzene (26.4 g, 0.1 mole) with stirring over a 25 minute period. During the addition, the temperature of the reaction mixture increased. After addition, the hot solution was stirred at room temperature for 2h and cooled to room temperature. To the cooled reaction mixture was added 50 ml of water and the mixture was filtered. The filtrate was then extracted 3x with 150 ml potions of pet. ether (30°-65° C. grade), and the extracts were combined and dried over anhydrous sodium sulfate overnight. The dried solution was evaporated to provide a crude solid product. Approximately 5 gm of the product was exposed to air for a few weeks to provide a blue-black, air-stable polymer having a conductivity of from $10^{-1}$ to $10^{-2}$ S/cm (compacted powders) determined by the four-in-line probe procedure described in H. H. Wieder, "Laboratory Notes on Electrical and Galvanomagnetic Measurements", Elsevier Scientific Publishing Co., New York, N.Y. 1979. The infrared spectrum of the crude material was obtained and was essentially identical to that of poly(isothianophthene) prepared electrochemically by the procedure described in F. Wudl, et al., *J. Org Chem* 49 pp. 3382-80 (1984).

EXAMPLE II

To a stirred solution of 1,3-dihydroisothianaphthene (0.68 g 5 mmole) in dry nitromethane (15 ml.) at 0° C. ($N_2$) was added a solution of anhydrous ferric chloride (0.81 g 5 mmole) in nitromethane (15 mL). The color of the mixture turned red immediately. After stirring at room temperature for one half hour, the system was opened to the air and stirred at 50° C. overnight.

The precipitated solids were filtered, washed with nitromethane and acetone, then soxhlet extracted with tetrahydrofuran for 2 days to give a deep blue powder (0.37 g) with a pressed pellet conductivity (4-point probe) of 0.3 S/cm. Elemental analysis indicated an empirical formula of $(C_{8.02} H_{3.98}S)^+(FeCl_4^-)_{0.0027}(H_2O)_{0.36}$ theoretical: $(C_8H_4S)^+_n (FeCl_4^-)_m$.

EXAMPLE III

To a stirred solution of 1,3-dihydroisothianaphthene (0.68 g, 5 mmole) in dry nitromethane (15 mL) at 0° C. ($N_2$) was added a solution of anhydrous nitrosonium hexafluoro antimanate (1.33 g, 5 mmole) in nitromethane (15 mL). The color of the mixture turned red immediately. After stiring at room temperature for half hour, the system was opened to the air and stirred at 50° C. overnight.

The blue-black color mixture was filtered and the solid was washed with nitromethane and acetone, then soxhlet extracted wtih tetrahydrofuran for 2 days to give deep blue solids (0.78 g). An empirical formula derived from elemental analysis indicated that the composition was: $(C_{8.3} H_{4.1}S)^+(SbF_{6.3}^-)_{0.22}$ theoretical: $(C_8H_4S)^+(SbF_6^-)_m$. The sample had a pressed pellet conductivity of 0.42 $ohm^{-1}cm^{-1}$ as determined with a 4-in-line probe.

What is claimed is:

1. A process for preparing conductive poly(isothianaphthene) which comprises exposing 1,3-poly(isothianaphthene) to an oxidizing/doping agent selected from the group consisting of oxygen and oxidant/dopants.

2. A process according to claim 1 wherein said dihydroisothianaphthene and said oxidizing agent are contacted in solution.

3. A process according to claim 1 wherein said dihydroisothianaphthene is contacted with one or more oxidant/dopants alone or in combination with a gas comprising oxygen.

4. A process according to claim 3 wherein said dihydroisothianaphthene is contacted with a combination of a gas containing oxygen and a chemical oxidant/dopant.

5. A process according to claim 4 wherein said gas is air.

6. A process according to claim 4 wherein said oxidising/doping agent is selected from the group consisting of Fe(III) salts, NO+ salts, $MoOCl_4$, $MoCl_5$, $PCl_5$, $POCl_3$ and $AlCl_3/CuCl_2$.

7. A process according to claim 6 wherein said oxidising/doping agent is selected from the group consisting of $MoOCl_4$, $MoCl_5$, $PCl_5$, $POCl_3$, $MoOCl_4$, Fe($ClO_4$)$_3$, $FeCl_3$, $NOBF_4$, $NOSbF_6$ and $NOCF_3SO_3$.

8. A process according to claim 7 wherein said oxidising/doping agent is selected from the group consisting of $MoOCl_4$, $NOBF_4$, $NOPF_6$, $NOSbF_6$, $NOCF_3SO_3$ and $FeCl_3$.

9. A process according to claim 8 wherein said oxidising/doping agent is selected from the group consisting of $FeCl_3$ and $NOSbF_6$.

* * * * *